Figure 1:
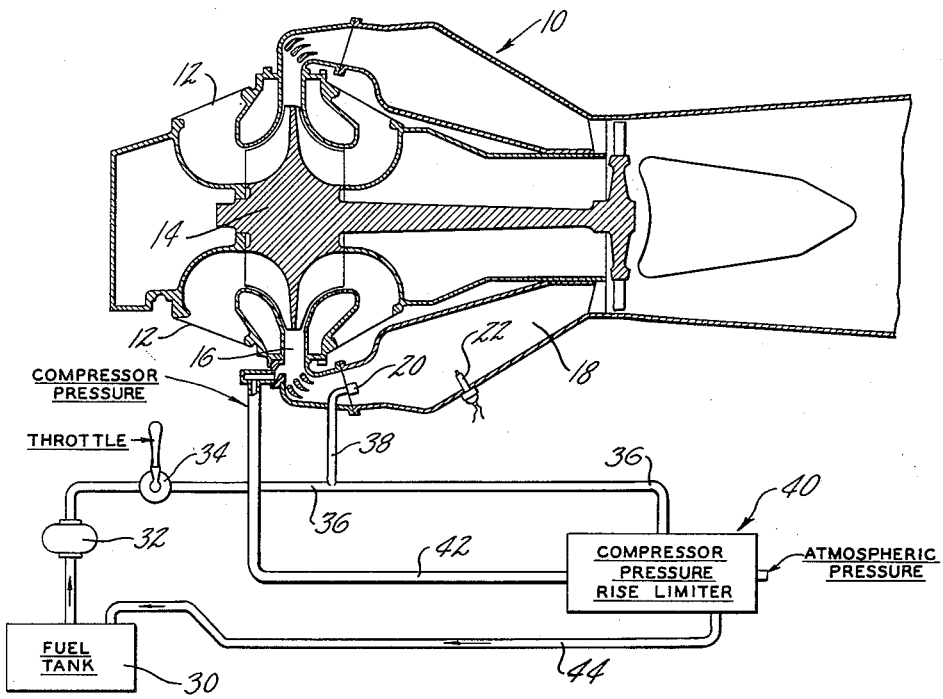

Nov. 16, 1954  S. G. BEST  2,694,290

REGULATOR FOR LIMITING COMPRESSOR PRESSURE RISE

Filed July 25, 1951

INVENTOR
STANLEY G. BEST

BY Leonard F. Wellind
ATTORNEY

United States Patent Office 2,694,290
Patented Nov. 16, 1954

2,694,290

REGULATOR FOR LIMITING COMPRESSOR PRESSURE RISE

Stanley G. Best, Manchester, Conn., assignor to United Aircraft Corporation, East Hartford, Conn., a corporation of Delaware Application July 25, 1951, Serial No. 238,537

4 Claims. (Cl. 60—39.28)

This invention relates to gas turbine power plants and more particularly to devices for limiting the maximum pressure rise across the compressors of such power plants. When a gas turbine is in operation a pressure differential exists between the inlet and outlet of the compressor as well as between the inside and outside walls thereof. In aircraft power plants the walls of the compressor are comparatively thin and hence it is desirable to keep the maximum pressure rise from exceeding a certain safe operating limit.

It is therefore an object of this invention to provide a mechanism for maintaining the pressure rise across a compressor below a predetermined value.

A further object of this invention is to provide a device for limiting the maximum pressure rise of a compressor which device responds to the compressor outlet pressure to by-pass a portion of the fuel being fed to the power plant.

Figure 2:
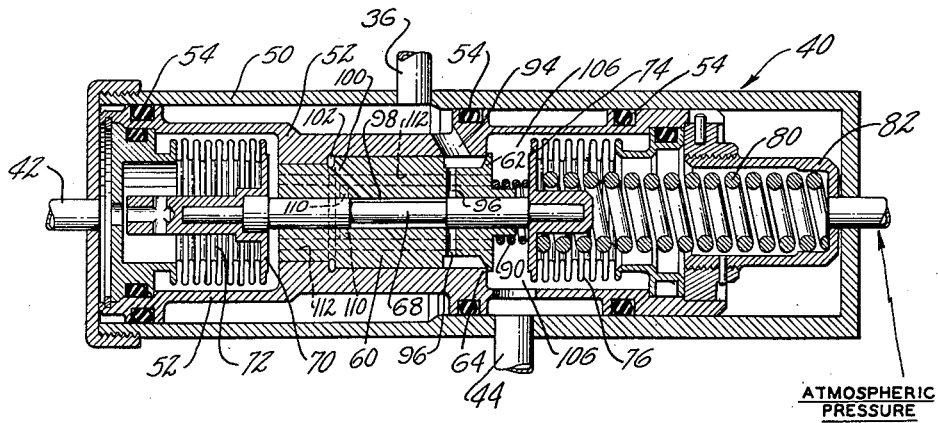

These and other objects will become readily apparent from the following detailed description of the drawing in which:

Fig. 1 is a schematic illustration of a gas turbine power plant and a simplified fuel system therefor; and Fig. 2 is a detailed illustration of the compressor pressure limiting mechanism.

Referring to Fig. 1, a gas turbine power plant 10 is illustrated having an air inlet 12, a compressor 14 whose outlet 16 leads to a combustion chamber 18 wherein fuel is admitted via a nozzle 20 and ignited by any suitable means such as illustrated at 22.

The fuel is supplied from a tank 30 from whence it passes to a pump 32, a throttle valve 34 and then to the lines 36 and 38 to the nozzle 20. The compressor pressure limiting device is generally indicated at 40 and includes a connection 42 to the outlet side of the compressor 14 and further includes a connection to the fuel line 36 and the drain line 44. Thus the compressor pressure rise limiting device serves to by-pass a portion of the fuel from the line 36 to the drain line 44 when the pressure at the compressor outlet rises above a predetermined value.

The pressure rise limiting device 40 is illustrated in more detail in Fig. 2. As illustrated herein, the device consists of an outer casing 50 and an inner casing 52 held in sealing relation relative to each other by means of a plurality of ring seals 54. The pressure limiting device located internally of the casings 50 and 52 primarily consists of a pilot valve mechanism and a servo-mechanism responsive to the movements of the pilot valve for operating a main by-pass valve. To this end a main valve element 60 is slidable within the inner casing 52 and includes a flanged end 62 which cooperates with a seat 64 on the casing 52 to form a by-pass valve opening which can be closed as shown. A pilot valve 68 is located centrally of the main valve element 60 and has its opposite ends fixed to a movable wall 70 of a bellows 72 and a movable wall 74 of a bellows 76, respectively. The inside of the bellows 72 is exposed to compressor outlet pressure via the line 42. Hence, an increase in compressor pressure will tend to move the movable wall 70 and the pilot valve 68 toward the right. The inside of the bellows 76 is exposed to atmospheric pressure while its movable wall 74 is urged to the left by means of a spring 80 whose tension may be adjusted to a desirable value by means of a threaded cap 82.

Since the main valve element 60 is freely movable within the inner casing 52, a spring 90 is used to urge this valve to the left.

The inner casing 52 includes a port 94 which contains fuel under pressure equal to that in the line 36. Port 94 communicates with a port 96 in the main valve element 60 and is opened to the chamber 98 when the pilot valve 68 is moved toward the right. Thus, when the compressor outlet pressure reaches a value which is high enough to overcome the force of the spring 80, the wall 70 of the bellows 72 will move the pilot valve 68 to the right to permit fuel under pressure to pass from the ports 94, 96 to the chamber 98 and then via passage 100 to an annular chamber 102. The pressure in chamber 102 then moves the main valve element 60 toward the right permitting fuel from the line 36 and the port 94 to flow to the chamber 106 on the downstream side of the main valve element 60 and then out to drain via the line 44.

When the main valve element 60 is moved toward the right a sufficient amount, the port 96 will again be closed off by the pilot valve 68 so that the main valve element 60 will maintain this open position until the compressor outlet pressure is reduced to the extent that the pilot valve 68 will then be moved to the left. As the pilot valve 68 is moved toward the left a port 110 is opened so that fuel pressure in the chamber 102 is able to drain out via the passage 100, chamber 98, port 110 and then to the axial passage 112 in the main valve element 60 and out through the chamber 106 and the passage 44 to drain. Drainage of the fuel from the chamber 102 in this manner immediately permits the spring 90 to move the main valve element 60 toward the left to a closed position.

It should be noted that the axial passages 112 in the main valve element 60 insure that equal pressures exist in the area surrounding each of the bellows 72 and 76.

As a result of this invention it is apparent that a simple but positively acting device has been provided for automatically reducing the fuel flow to the combustion chamber of a gas turbine power plant when the pressure at any point in the compressor reaches a predetermined value.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In a gas turbine power plant having a compressor, a combustion chamber receiving air from the compressor, a source of fuel under pressure and means for injecting said fuel into said combustion chamber including a throttle valve between said source and said combustion chamber, the combination of means for by-passing a portion of the fuel leading from said throttle valve to said combustion chamber comprising a by-pass valve, a pilot valve, means responsive to a predetermined pressure rise across said compressor for moving said pilot valve, and a chamber open to the inlet side of said by-pass valve when said pilot valve is in one position and open to the outlet side of said by-pass valve when said pilot valve is in another position relative to said by-pass valve.

2. In a gas turbine power plant having a compressor, a combustion chamber receiving air from the compressor, a source of fuel under pressure and means for injecting said fuel into said combustion chamber including a throttle valve between said source and said combustion chamber, the combination of means for by-passing a portion of the fuel leading from said throttle valve to said combustion chamber comprising a by-pass valve, a pilot valve, means responsive to a predetermined pressure rise across said compressor for moving said pilot valve, comprising a pair of bellows having their movable walls fixed to opposing ends of said pilot valve, the inside of one of said bellows being exposed to compressor outlet pressure, a spring urging the movable wall of the other of said bellows in opposition to said one bellows, and a servomechanism controlled by said pilot valve for moving said by-pass valve.

3. In a gas turbine according to claim 2 wherein a casing surrounds the by-pass valve and includes a chamber, means on said by-pass valve forming a movable wall of said chamber, and said pilot valve directs fuel from the inlet side of said by-pass valve to said chamber and from said chamber to drain upon movement of said pilot valve relative to said by-pass valve.

4. In a valve for draining fluid from a main source, a pilot valve, a bellows fixed to each end of said pilot valve, one of said bellows having its interior communicating with a source of fluid under one pressure and the other of said bellows having its interior communicating with a source of fluid under another pressure, a spring urging said other bellows in opposition to said one bellows, a main valve element surrounding said pilot valve in sealing relationship therewith including a plurality of ports, a seat carried by said casing cooperating with said main valve element, passages in said casing communicating with either side of said main valve element, one of said passages also communicating with said main source, and a chamber communicating with one of said ports and said one passage when said pilot valve is moved in opposition to said spring for moving said main valve element to drain fluid from one side thereof to the other, said chamber communicating with the other side of said main valve element when said pilot valve is returned by said spring.

References Cited in the file of this patent

UNITED STATES PATENTS

| Number | Name | Date |
|---|---|---|
| 1,254,869 | Watrous | Jan. 29, 1918 |
| 2,111,230 | Toussaint | Mar. 15, 1938 |
| 2,222,237 | Philipp | Nov. 19, 1940 |
| 2,315,715 | Leibing | Apr. 6, 1943 |
| 2,323,838 | Nixon | July 6, 1943 |
| 2,384,282 | Chandler | Sept. 4, 1945 |
| 2,411,312 | Yonkers | Nov. 19, 1946 |
| 2,422,808 | Stokes | June 24, 1947 |
| 2,503,048 | Ifield | Apr. 4, 1950 |
| 2,531,780 | Mock | Nov. 28, 1950 |
| 2,545,698 | Holley et al. | Mar. 20, 1951 |
| 2,560,118 | Malone et al. | July 10, 1951 |
| 2,570,591 | Price | Oct. 9, 1951 |
| 2,590,853 | Fulton | Apr. 1, 1952 |
| 2,594,689 | Sharp et al. | Apr. 29, 1952 |

FOREIGN PATENTS

| Number | Country | Date |
|---|---|---|
| 941,556 | France | July 19, 1948 |